(12) United States Patent
Hwang et al.

(10) Patent No.: US 12,702,986 B2
(45) Date of Patent: Aug. 11, 2026

(54) FOOD WASTE DISPOSER

(71) Applicant: SAMSUNG ELECTRONICS CO., LTD., Suwon-si (KR)

(72) Inventors: Yongjun Hwang, Suwon-si (KR); Keonpyo Koo, Suwon-si (KR); Kyoungmok Kim, Suwon-si (KR); Jiho Seo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 356 days.

(21) Appl. No.: 18/585,732

(22) Filed: Feb. 23, 2024

(65) Prior Publication Data

US 2024/0189830 A1 Jun. 13, 2024

Related U.S. Application Data

(63) Continuation of application No. PCT/KR2022/011471, filed on Aug. 3, 2022.

(30) Foreign Application Priority Data

Aug. 31, 2021 (KR) ........................ 10-2021-0115920
Oct. 15, 2021 (KR) ........................ 10-2021-0137755

(51) Int. Cl.
*B02C 18/00* (2006.01)
*B02C 18/14* (2006.01)
(Continued)

(52) U.S. Cl.
CPC ...... *B02C 18/0092* (2013.01); *B02C 18/0084* (2013.01); *B02C 18/142* (2013.01);
(Continued)

(58) Field of Classification Search
CPC ....... B09B 2101/70; B09B 3/35; B02C 18/08; B02C 2201/066; B65F 2210/12;
(Continued)

(56) References Cited

U.S. PATENT DOCUMENTS 12,186,760 B2 * 1/2025 Seo ..................... B02C 18/0092
2003/0136273 A1 * 7/2003 Eom ....................... B02C 18/12 99/485

(Continued)

FOREIGN PATENT DOCUMENTS

CN 108554547 A 9/2018
CN 110847309 A 2/2020

(Continued)

OTHER PUBLICATIONS

International Search Report dated Nov. 30, 2022 issued in PCT Application No. PCT/KR2022/011471.

(Continued)

*Primary Examiner* — Jared O Brown
(74) *Attorney, Agent, or Firm* — STAAS & HALSEY LLP

(57) ABSTRACT

A food waste disposer includes a housing, a grinding device detachably mounted inside the housing to grind food waste, and a storage device disposed below the grinding device to store the ground food waste, the grinding device includes a grinding case in which the food waste is ground, and having a discharge portion and openable to transfer the food waste to the storage device, a valve assembly configured to open or close the discharge portion and to be separable to the outside of the housing together with the grinding case, a first grinder rotatably mounted inside the grinding case, and having a grinding blade, a second grinder including a grinding blade to mutually grind the food waste with the grinding blade of the first grinder and a transfer blade below the first grinder and the second grinder to transfer the ground food waste to the discharge portion.

14 Claims, 12 Drawing Sheets

(51) Int. Cl.

| | |
|---|---|
| ***B02C 18/24*** | (2006.01) |
| ***B09B 3/35*** | (2022.01) |
| ***B09B 101/70*** | (2022.01) |
| ***B65F 1/14*** | (2006.01) |
| *E03C 1/266* | (2006.01) |

(52) U.S. Cl.

CPC ................ *B02C 18/24* (2013.01); *B09B 3/35* (2022.01); *B02C 2201/06* (2013.01); *B02C 2201/063* (2013.01); *B02C 2201/066* (2013.01); *B09B 2101/70* (2022.01); *B65F 2001/1489* (2013.01); *B65F 2210/12* (2013.01); *B65F 2210/126* (2013.01); *B65F 2210/169* (2013.01); *B65F 2240/138* (2013.01); *E03C 1/2665* (2013.01); *Y02W 30/40* (2015.05); *Y02W 30/52* (2015.05)

(58) Field of Classification Search

CPC .......... B65F 2210/126; B65F 2210/169; B65F 2240/138; B65F 2001/1489

See application file for complete search history.

(56) References Cited

U.S. PATENT DOCUMENTS

| | | | |
|---|---|---|---|
| 2019/0092575 A1 | 3/2019 | Koh | |
| 2021/0214283 A1* | 7/2021 | Atkinson | ............ B02C 18/0092 |
| 2023/0001423 A1* | 1/2023 | Seo | ..................... B02C 18/0092 |

FOREIGN PATENT DOCUMENTS

| | | | | | |
|---|---|---|---|---|---|
| CN | 111790498 | A | | 10/2020 | |
| CN | 111879065 | A | * | 11/2020 | ........... E03C 1/2665 |
| CN | 109569819 | B | | 3/2021 | |
| CN | 112517195 | A | | 3/2021 | |
| JP | 2001-104812 | | | 4/2001 | |
| JP | 2005-230639 | | | 9/2005 | |
| JP | 6530470 | | | 6/2019 | |
| JP | 2021-62359 | | | 4/2021 | |
| KR | 20-0158821 | | | 10/1999 | |
| KR | 10-2010-0024744 | | | 3/2010 | |
| KR | 10-2010-0064769 | | | 6/2010 | |
| KR | 20100064769 | A | * | 6/2010 | ......... B02C 18/0092 |
| KR | 10-1196428 | | | 11/2012 | |
| KR | 10-2013-0137444 | | | 12/2013 | |
| KR | 10-1523759 | | | 5/2015 | |
| KR | 10-2015-0127312 | | | 11/2015 | |
| KR | 10-2015-0127313 | | | 11/2015 | |
| KR | 10-2019-0000244 | | | 1/2019 | |
| KR | 10-2021-0046596 | | | 4/2021 | |
| KR | 10-2550658 | | | 7/2023 | |
| WO | WO-2023019340 | A1 | * | 2/2023 | ............ B02C 18/18 |

OTHER PUBLICATIONS

Written Opinion dated Nov. 30, 2022 issued in PCT Application No. PCT/KR2022/011471.

* cited by examiner 72
726
721
722
724
723
7251
725
722
1432
(143)
1431
(143)
141
142
140
144

FOOD WASTE DISPOSER

CROSS-REFERENCE TO RELATED APPLICATIONS

This application is a continuation application, filed under 35 U.S.C. § 111(a), of International Application PCT/KR2022/011471 filed Aug. 3, 2022, and is based on and claims priority under 35 U.S.C. § 119 to Korean Patent Applications No. 10-2021-0115920, filed on Aug. 31, 2021, and No. 10-2021-0137755, filed on Oct. 15, 2021 in the Korean Intellectual Property Office, the disclosures of which are incorporated by reference herein in their entireties.

TECHNICAL FIELD

The present disclosure relates to a food waste disposer, and particularly to a food waste disposer with an improved structure.

BACKGROUND ART

Generally, a food waste disposer is a device that disposes of food waste by drying, stirring, and grinding the food waste. This food waste disposer may include a grinding device in which food waste is stirred and ground. In addition, the food waste disposer includes a heating device that applies heat to the grinding device to dry the food inside the grinding device.

The grinding device includes a grinding case used as a container in which food is heated and ground, and includes a grinder provided to be rotatable inside the grinding case.

However, in a case in which a single grinder for grinding food waste is provided, as the food waste inside the grinding case moves to edges thereof and clumps up, grinding the food waste may not be easy and may cause a malfunction.

DISCLOSURE

Technical Problem

The present disclosure is directed to providing a food waste disposer having an improved grinder to improve the disposing performance of the food waste disposer.

The present disclosure is directed to providing an improved food waste disposer such that a driving device for driving a grinder and a valve assembly is compactly disposed.

Technical Solution

According to an embodiment of the disclosure, a food waste disposer may comprise a housing, a grinding device detachably mounted inside the housing to grind food waste, and a storage device disposed below the grinding device to store the ground food waste.

The grinding device may comprise a grinding case in which the food waste is ground, the grinding case having a discharge portion on a lower side of the grinding case, the discharge portion openable to transfer the food waste to the storage device, a valve assembly configured to open or close the discharge portion and to be separable to outside of the housing together with the grinding case, a first grinder rotatably mounted inside the grinding case, and having a grinding blade, and a second grinder comprising a grinding blade to mutually grind the food waste with the griding blade of the first grinder, and a transfer blade below the first grinder and the second grinder to transfer the ground food waste by the first grinder and the second grinder to the discharge portion.

A length at which the transfer blade extends in a radial direction from a rotation axis of the first grinder may be formed to be longer than a length at which the grinding blade extends in the radial direction from the rotation axis of the first grinder.

The grinding case may comprise a bottom surface, a side wall formed perpendicular to the bottom surface of the grinding case, and an inclined portion formed to be inclined at a lower portion of the side wall so that a cross-sectional area of the grinding case decreases in a direction from the side wall toward the discharge portion.

The transfer blade may comprise a first transfer portion extending radially outward from a center of the transfer blade in an extension direction, and a second transfer portion extending radially outward from the center of the transfer blade in an opposite direction to the extension direction of the first transfer portion.

A height of a bottom surface of the grinding case on a side on which the first grinder is mounted may be different from a height of the bottom surface of the grinding case on a side on which the second grinder is mounted.

The grinding blade of the first grinder may comprise a first upper blade, a first middle blade, and a first bottom blade that are rotatable by being axially spaced apart from each other at different heights.

The grinding blade of the second grinder may comprise: a second upper blade rotatable between the first upper blade and the first middle blade; and a second middle blade rotatable between the first middle blade and the first bottom blade, and the transfer blade of the second grinder is rotatable below the first bottom blade.

The food waste disposer may further comprises: a first driving device to supply power to the first grinder and the second grinder to be rotatable; and a second driving device to supply power to the valve assembly to open or close the discharge portion.

The first driving device may comprise: a first motor to generate power; a first motor shaft to transmit the generated power of the first motor; a first input gear coupled to the first motor shaft; and a plurality of first output gears to transmit the power transmitted by the first input gear to the first grinder and the second grinder.

The second driving device may comprise: a second motor to generate power; a second input gear to receive the generated power from the second motor; and a second output gear to receive the power from the second input gear and transmit the received power to the valve assembly.

The valve assembly may comprise: a valve to open or close the discharge portion; and a valve shaft connected to the valve to rotate the valve, the valve shaft comprising a first surface and a second surface perpendicular to the first surface, a width of the first surface being different from a width of the second surface.

The second output gear may comprise a shaft passing groove having one side opened such that the valve shaft is separated upward from the second output gear in response to inserting the valve shaft with the first surface facing upward.

The grinding device may further comprise a first grinder shaft and a second grinder shaft to transmit rotational forces to the first grinder and the second grinder, respectively, and the food waste disposer further comprises a heating device on a lower side of the grinding device, the heating device comprising a plurality of shaft passing holes through which the first grinder shaft and the second grinder shaft pass, respectively.

The discharge portion and the valve assembly in communication with the discharge portion may be located within a rotation radius of the transfer blade.

The first grinder and the second grinder may be coupled to a bottom surface of the grinding case so as to rotate about a vertical direction of the grinding case.

The grinding device may be separable to outside of the housing in a state in which the valve assembly closes the discharge portion.

Another aspect of the present disclosure provides a food waste disposer including a housing, a grinding device detachably mounted inside the housing and including a plurality of grinders provided to grind food waste and a valve assembly provided to open and close a discharge portion, a storage device disposed below the grinding device to store the food waste transferred to the discharge portion, and a first driving device and a second driving device disposed between the grinding device and the storage device to provide power to the plurality of grinders and the valve assembly, respectively, wherein the plurality of grinders include a first grinder and a second grinder provided to rotate simultaneously through the first drive device, the valve assembly includes a valve shaft connected to the second driving device to rotate a valve member provided to open and close the discharge portion, and the valve shaft is provided to be separable from the second driving device when the valve member closes the discharge portion.

The first grinder may include a plurality of first grinding blades disposed to be spaced apart from each other in a vertical direction, and the second grinder may include a plurality of second grinding blades disposed to be alternately stacked with the plurality of first grinding blades and a transfer blade.

The transfer blade may be disposed below the plurality of second grinding blades to have a rotation radius larger than a rotation radius of the plurality of second grinding blades.

The grinding device may further include a grinding case in which the first grinder and the second grinder are accommodated, and the grinding case may be provided such that a height of a bottom surface of the grinding case on the first grinder side is different from a height of the bottom surface of the grinding case on the second grinder side.

The grinding case may include a side wall formed perpendicular to a bottom surface of the grinding case, and an inclined portion formed to be inclined at a lower portion of the side wall so that a cross-sectional area of the grinding case decreases in a direction from the side wall toward the discharge portion.

Advantageous Effects

According to an aspect of the present disclosure, a size of a food waste disposer can be further miniaturized by increasing the stirring and grinding efficiency of the food waste disposer through a plurality of grinders.

According to another aspect of the present disclosure, a transfer blade is provided such that food waste collected on a bottom surface of a grinding case can be easily transferred to a storage device.

According to another aspect of the present disclosure, a grinding device is provided to be separated to the outside of a housing in a state in which a discharge portion of the grinding device is closed, so that safety accidents and scattering of food waste due to opening of the discharge portion can be prevented.

MODE OF THE DISCLOSURE

Figure 1:
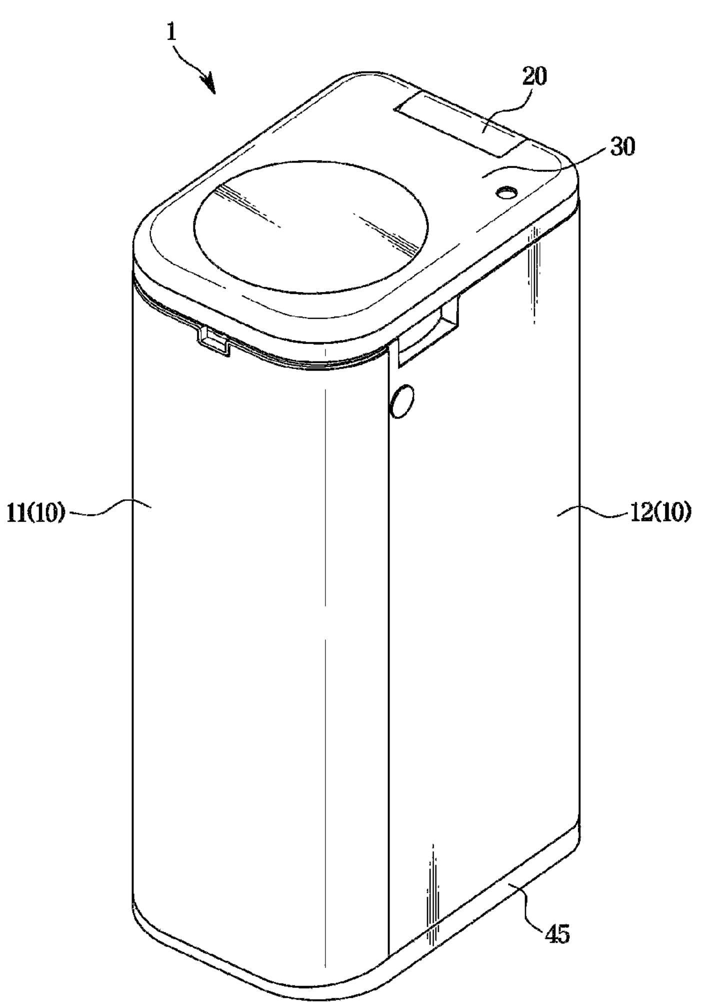
FIG. 1 is a perspective view of a food waste disposer according to an embodiment.

The embodiments described in the present specification and the configurations shown in the drawings are only examples of preferred embodiments of the present disclosure, and various modifications may be made at the time of filing of the present disclosure to replace the embodiments and drawings of the present specification.

Like reference numbers or signs in the various drawings of the application represent parts or components that perform substantially the same functions.

The terms used herein are for the purpose of describing the embodiments and are not intended to restrict and/or to limit the present disclosure. For example, the singular expressions herein may include plural expressions, unless the context clearly dictates otherwise. In the present specification, the terms "comprises" and "has" are intended to indicate that there are features, numbers, steps, operations, components, parts, or combinations thereof described in the specification, and do not exclude the presence or addition of one or more other features, numbers, steps, operations, components, parts, or combinations thereof.

It will be understood that, although the terms "first," "second," etc. may be used herein to describe various components, these components should not be limited by these terms, and the terms are only used to distinguish one component from another. For example, without departing from the scope of the present disclosure, a first component may be referred to as a second component, and similarly, the second component may also be referred to as a first component. The term "and/or" includes any combination of a plurality of related items or any one of a plurality of related items.

Hereinafter, embodiments of the present disclosure will be described in detail with reference to the accompanying drawings.

Figure 2:
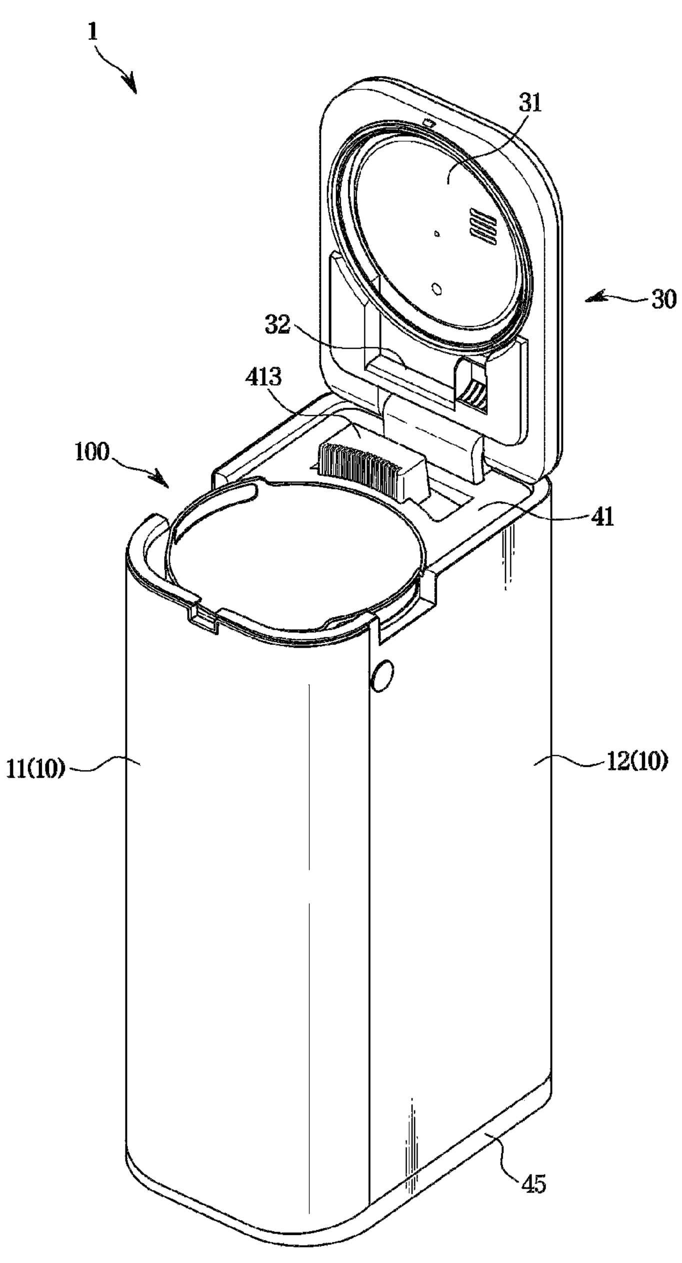
FIG. 2 is a perspective view illustrating a state in which the food waste disposer of FIG. 1 is opened.
Figure 3:
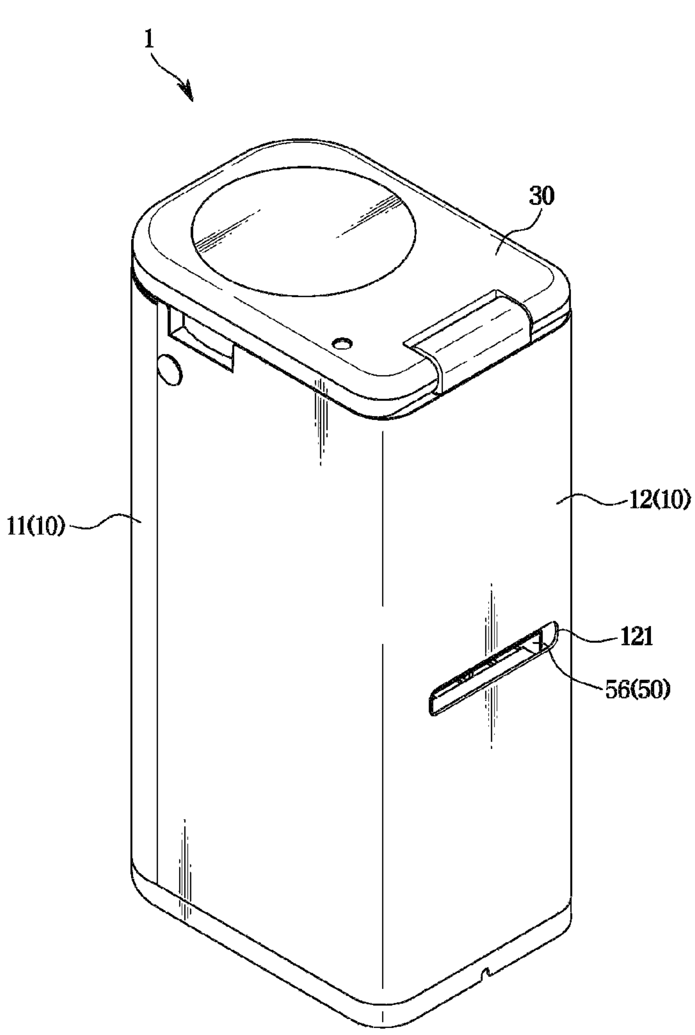
FIG. 3 is a rear perspective view of the food waste disposer of FIG. 1.

FIG. 1 is a perspective view of a food waste disposer according to an embodiment. FIG. 2 is a perspective view illustrating a state in which the food waste disposer of FIG. 1 is opened. FIG. 3 is a rear perspective view of the food waste disposer of FIG. 1.

Referring to FIGS. 1 to 3, the food waste disposer 1 according to an embodiment of the present disclosure may include a housing 10 forming an exterior and a cover member 30 provided to open and close an upper side of the housing 10.

The cover member 30 may be provided to be rotatable with respect to the housing 10 through a hinge 20.

The housing 10 may include a front housing 11 and a rear housing 12. The front housing 11 may form a front exterior of the food waste disposer 1. The rear housing 12 may form a rear exterior of the food waste disposer 1.

The front housing 11 and the rear housing 12 may be disposed on an upper side of a base frame 45 forming a bottom surface of food waste disposer 1.

The front housing 11 may be provided to be separable from the rear housing 12. Through this, a user may access various components disposed inside the food waste disposer 1 by separating the front housing 11.

The cover member 30 may include a grinding device cover part 31 and an upper frame accommodating part 32.

The grinding device cover part 31 may be provided in the front of the cover member 30 to open and close an open upper surface of a grinding device 100.

The upper frame accommodating part 32 may be provided at the rear of the grinding device cover part 31. The upper frame accommodating part 32 may be provided to accommodate a portion of an inhaling part 413 of an upper frame 41, which will be described later. Accordingly, the accommodating part of the upper frame 41 may be recessed into the inside of the cover member 30.

The grinding device 100 may be mounted inside the housing 10. More specifically, the grinding device 100 may pass through the front of the upper frame 41 to be accommodated inside the housing 10. A detailed description thereof will be provided later.

The rear housing 12 may include an exhaust hole 121. The exhaust hole 121 may be provided to communicate with an exhaust case 56 of a deodorizing device 50, which will be described later. The deodorizing device 50 may inhale bad odor from the grinding device 100, filter out the inhaled bad odor, and then discharge the filtered air to the outside. At this time, the filtered air may be discharged to the outside through the exhaust hole 121 of the rear housing 12.

Figure 4:
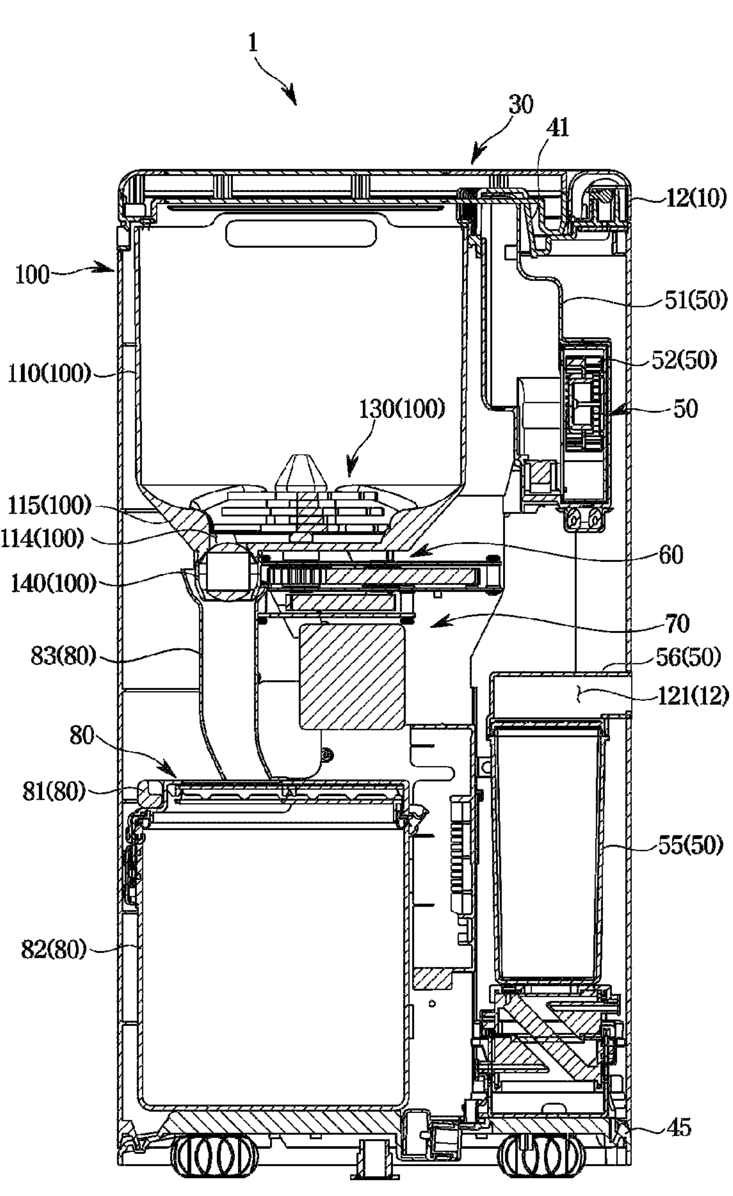
FIG. 4 is a cross-sectional view of the food waste disposer of FIG. 1.

FIG. 4 is a cross-sectional view of the food waste disposer of FIG. 1.

Referring to FIG. 4, the food waste disposer 1 may include the grinding device 100 disposed on an upper front side. The grinding device 100 may be disposed below the cover member 30. The cover member 30 may be provided to open and close the open upper surface of the grinding device 100. Alternatively, the cover member 30 may be provided to open and close the upper side of the housing 10.

The grinding device 100 may include a grinding case 110 in which food waste is ground. The grinding case 110 may include a discharge portion 114 opened to transfer the ground food waste to a storage device 80, which will be described later.

The food waste disposer 1 may include a heating device 60.

The heating device 60 may be disposed on a lower side of the grinding device 100 to heat the grinding device 100. More specifically, the heating device 60 may be provided to accommodate a heating wire therein. The heating device 60 may be disposed on a lower side of the grinding case 110 of the grinding device 100.

The grinding device 100 may be disposed inside an accommodating frame 46 fixed to the inside of the housing 10. The heating device 60 may also be disposed inside the accommodating frame 46.

The accommodating frame 46 may be provided to cover the outside of the grinding device 100 and the heating device 60 so that the grinding device 100 and the heating device 60 may be more stably supported and accommodated inside the food waste disposer 1.

The food waste disposer 1 may include a driving device 70.

The driving device 70 may be disposed on the lower side of the grinding device 100 and the heating device 60. The driving device 70 may be provided to transmit power to the grinding device 100.

More specifically, the driving device 70 may be provided to transmit power to a rotary grinder 120 of the grinding device 100 and to transmit power to a valve assembly 140 of the grinding device 100, respectively, which will be described later.

The driving device 70 described above may be supported on opposite sides thereof by side frames 44, which will be described later, to be fixed to the lower side of the grinding device 100. A detailed description of the driving device 70 will be described later.

The food waste disposer 1 may include the deodorizing device 50.

The deodorizing device 50 may be provided to inhale bad odor such as odor generated from the grinding device 100. The bad odor inhaled by the deodorizing device 50 may be filtered out and discharged back to the outside of the food waste disposer 1.

More specifically, the deodorizing device 50 may be disposed at an upper portion of the grinding device 100 to inhale odor. Accordingly, the deodorizing device 50 may be disposed at the rear of the grinding device 100.

The food waste disposer 1 may include the storage device 80.

The storage device 80 may be provided to transfer and store food waste dried and ground in the grinding device 100. The storage device 80 may be disposed below the grinding device 100 to store the ground food waste.

More specifically, the storage device 80 may include a transfer duct 83 connected to the valve assembly 140 of the grinding device 100.

The valve assembly 140 of the grinding device 100 may be provided to open and close the discharge portion 114 of the grinding case 110.

When the valve assembly 140 opens the discharge portion 114 of the grinding case 110, the ground food waste inside the grinding case 110 may be transferred to a storage case 82 of the storage device 80 through the transfer duct 83.

Figure 5:
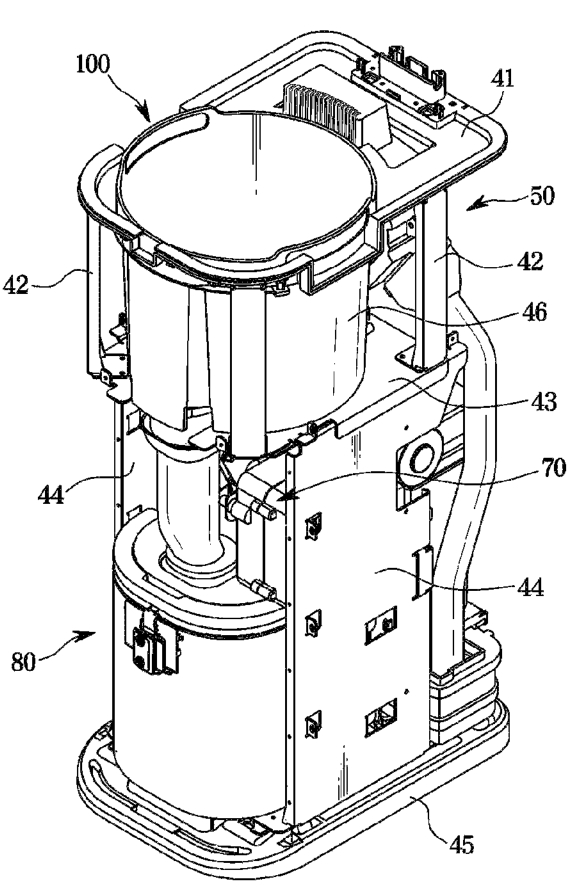
FIG. 5 is a perspective view illustrating a state in which a housing and a cover member are removed from the food waste disposer according to an embodiment.
Figure 6:
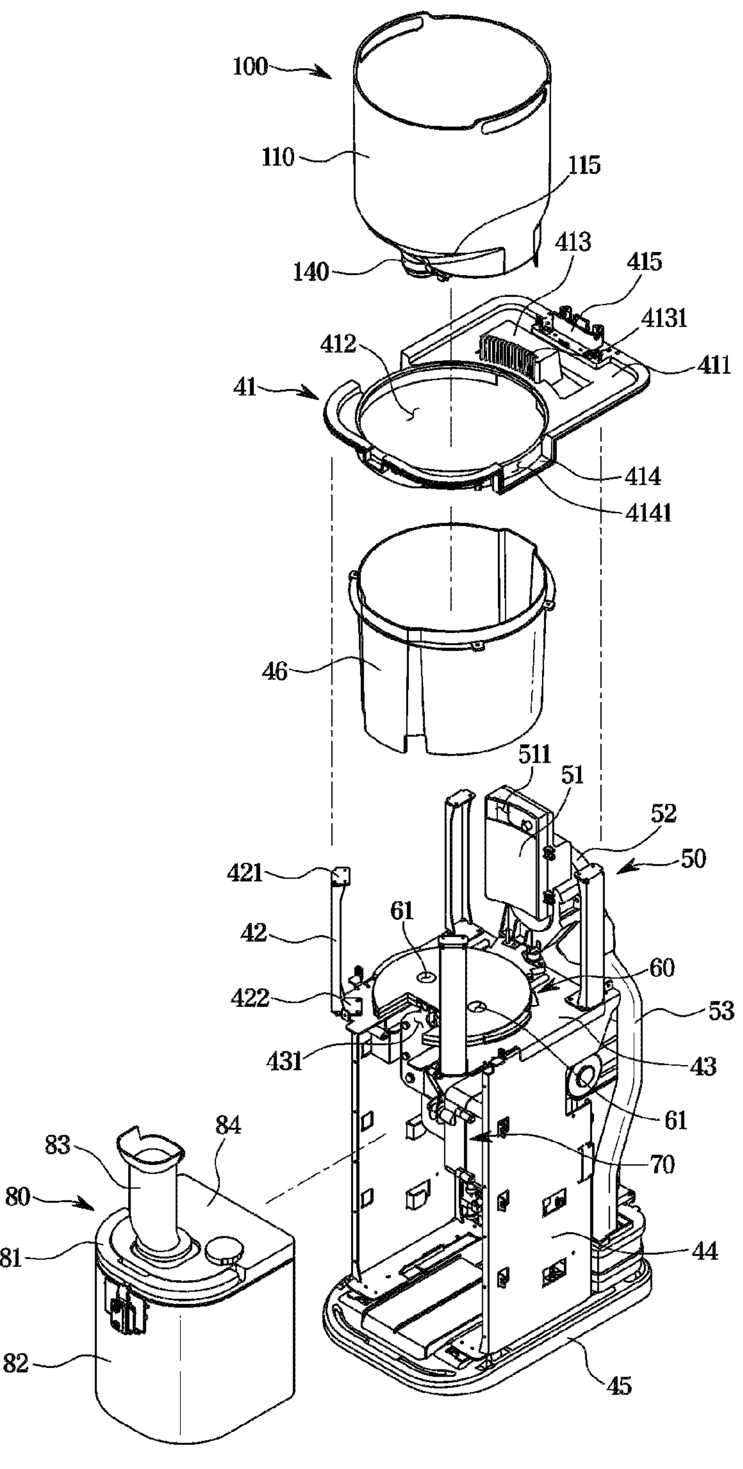
FIG. 6 is an exploded perspective view of the food waste disposer of FIG. 5.
Figure 7:
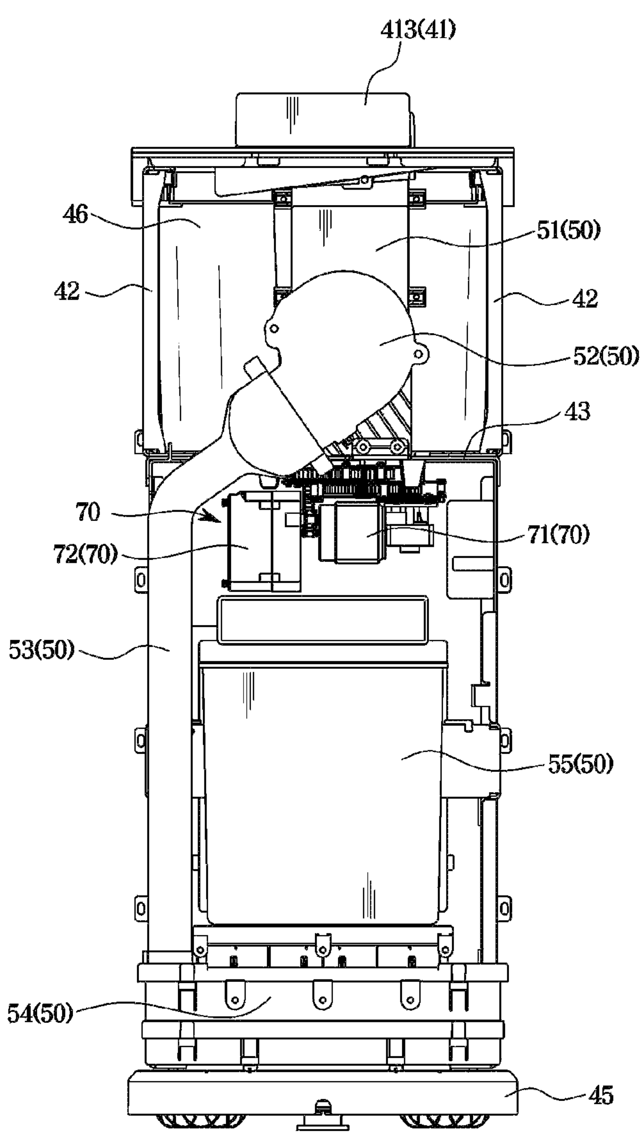
FIG. 7 is a view illustrating the rear of the food waste disposer of FIG. 5.

FIG. 5 is a perspective view illustrating a state in which a housing and a cover member are removed from the food waste disposer according to an embodiment. FIG. 6 is an exploded perspective view of the food waste disposer of FIG. 5. FIG. 7 is a view illustrating the rear of the food waste disposer of FIG. 5.

Referring to FIGS. 5 to 7, the food waste disposer 1 according to an embodiment of the present disclosure may include a plurality of frames provided to support the grinding device 100, the deodorizing device 50, the storage device 80, the driving device 70, and the like.

The food waste disposer 1 may include the upper frame 41. The grinding device 100 may be inserted in the front of the upper frame 41.

The upper frame 41 may include a base part 411. The base part 411 may be provided to form an upper surface of the upper frame 41.

The upper frame 41 may include an opening 412 formed in the front of the base part 411. The grinding device 100 may be provided to be separable to the outside of the housing 10 through the opening 412. The opening 412 may be provided in a size corresponding to the open upper surface of the grinding device 100.

Therefore, the user may put food waste into the grinding device 100 through the opening 412. That is, the opening 412 may be provided as a type of input port. The cover member 30 may be provided to open and close the opening 412 of the upper frame 41.

The upper frame 41 may include the inhaling part 413 provided at the rear of the opening 412. The inhaling part 413 may protrude upward from the base part 411 of the upper frame 41.

The inhaling part 413 may be provided to accommodate a portion of the deodorizing device 50. More specifically, the inhaling part 413 may be provided to accommodate an upper portion of a communication case 51 of the deodorizing device 50, which will be described later.

A communication hole 4131 formed to communicate with the grinding device 100 may be formed on the inhaling part 413 of the upper frame 41. A plurality of the communication holes 4131 may be provided.

Therefore, air in the grinding device 100 may flow into the inhaling part 413 through the communication hole 4131 of the upper frame 41 by an inhaling force generated from the deodorizing device 50, and the air flowed into the inhaling part 413 may flow into the inside of the communication case 51 of the deodorizing device 50. A detailed description thereof will be provided later.

The upper frame 41 may include recessed portions 414 provided on opposite sides thereof. The recessed portion 414 may be provided to be bent downward from the base part 411 of the upper frame 41. The depression 414 may form a gripping space 4141 therein.

Through this, a handle part 113 of the grinding device 100 is disposed in the recessed portion 414, so that the user may easily grip the handle part 113 when separating the grinding device 100.

The upper frame 41 may include a hinge mounting portion 415 provided at the rear. The hinge 20 illustrated in FIG. 1 may be mounted on the hinge mounting portion 415. Through this, the cover member 30 may be rotatably coupled to the upper frame 41.

The food waste disposer 1 may include the accommodating frame 46.

The accommodating frame 46 may be provided to accommodate the grinding device 100 therein. The accommodating frame 46 may be disposed on a lower side of the upper frame 41.

The accommodating frame 46 may be provided in a substantially cylindrical shape with upper and lower sides thereof open.

The food waste disposer 1 may include a bottom frame 43.

The bottom frame 43 may be provided such that the accommodating frame 46 is mounted thereon. The heating device 60 may be disposed on the bottom frame 43. A cutout portion 431 may be formed in the front of the bottom frame 43.

Through this, the grinding case 110 of the grinding device 100 may be disposed on the upper side of the heating device 60, and the valve assembly 140, which protrudes further downward than the grinding device 100, may pass through the bottom frame 43 and be disposed in the front of the bottom frame 43.

The food waste disposer 1 may include a support frame 42. A plurality of the support frames 42 may be provided to support the upper frame 41. FIG. 6 illustrates a total of the four support frames 42, but the number of support frames 42 is not limited thereto.

The support frame 42 may include an upper support part 421 provided at an upper end thereof to support the upper frame 41. The support frame 42 may also include a bottom mounting part 422 provided at a lower end to be mounted on the bottom frame 43.

The support frame 42 may be provided in a substantially bar shape to support the upper frame 41 while occupying a minimal space.

The food waste disposer 1 may include the side frame 44 and the base frame 45 forming a bottom surface. A pair of side frames 44 may be provided.

The side frames 44 may be disposed below opposite sides of the bottom frame 43. The side frame 44 may be disposed between the bottom frame 43 and the base frame 45.

The side frame 44 may include a side body part 441 provided to cover opposite sides of the storage device 80.

The side frame 44 may include a driving device support part 442 bent toward the inside of the side body part 441 to be coupled to the bottom frame 43.

The storage device 80 may receive dried and ground food waste from the grinding device 100 through the transfer duct 83. The storage device 80 may include the storage case 82. The storage case 82 may be connected to the transfer duct 83 to store ground food waste.

The storage device 80 may include a case cover part 84 provided on an upper side of the storage case 82. A grip part 81 capable of being gripped may be mounted on the front of the case cover part 84.

The deodorizing device 50 may include the communication case 51.

The communication case 51 may be disposed at the rear of the grinding device 100. More specifically, the upper portion of the communication case 51 may be accommodated in the inhaling part 413 of the upper frame 41.

The communication case 51 may include an inhaling hole 511 provided by being cut on a front surface thereof. Moisture or odor generated inside the grinding device 100 may be introduced into the communication hole 4131 formed on the inhaling part 413 of the upper frame 41 and the inhaling hole 511 of the communication case 51.

The deodorizing device 50 may include a fan mounting case 52.

The fan mounting case 52 may be connected to the communication case 51. The fan mounting case 52 may be provided such that an inhaling airflow directing to the communication case 51 from the grinding device 100 is formed.

A blowing fan 521 may be disposed inside the fan mounting case 52 to generate an inhaling force.

The deodorizing device 50 may include a deodorizing duct 53.

The deodorizing duct 53 may be connected to the fan mounting case 52. The deodorizing duct 53 may form a path through which air introduced into the fan mounting case 52 flows.

The deodorizing device 50 may include a duct mounting frame 54 and a filter part 55.

The duct mounting frame 54 may be connected to the deodorizing duct 53. The filter part 55 may be mounted on an upper side of the duct mounting frame 54.

A deodorizing filter (not shown) made of activated carbon or the like is disposed inside the filter part 55 to filter contaminated air generated from the grinding device 100. The filter part 55 may include a filter case 551.

The deodorizing device 50 may include an exhaust case 56.

The exhaust case 56 may be mounted on one side of the filter part 55 so that the air filtered from the filter part 55 flows. More specifically, the exhaust case 56 may be mounted on an upper side of the filter part 55.

Therefore, the filtered air may be discharged to the outside through the exhaust case 56 communicating with the exhaust hole 121 of the rear housing 12.

The heating device 60 may include a plurality of shaft passing holes 61 through which a first grinder shaft 160 and a second grinder shaft 150 pass so that the driving device 70 may transmit power to the grinding device 100. The heating device 60 may be disposed between the grinding device 100 and the driving device 70 to heat the grinding device 100. The heating device 60 may also be provided between the grinding device 100 and the storage device 80.

The driving device 70 may include a first driving device 71 and a second driving device 72. The first driving device 71 may provide power to rotate a first grinder 130 and the second grinder 120 of the grinding device 100. The second driving device 72 may provide power to rotate the valve assembly 140 of the grinding device 100 to open and close the discharge portion 114. A detailed description thereof will be provided later.

Figure 8:
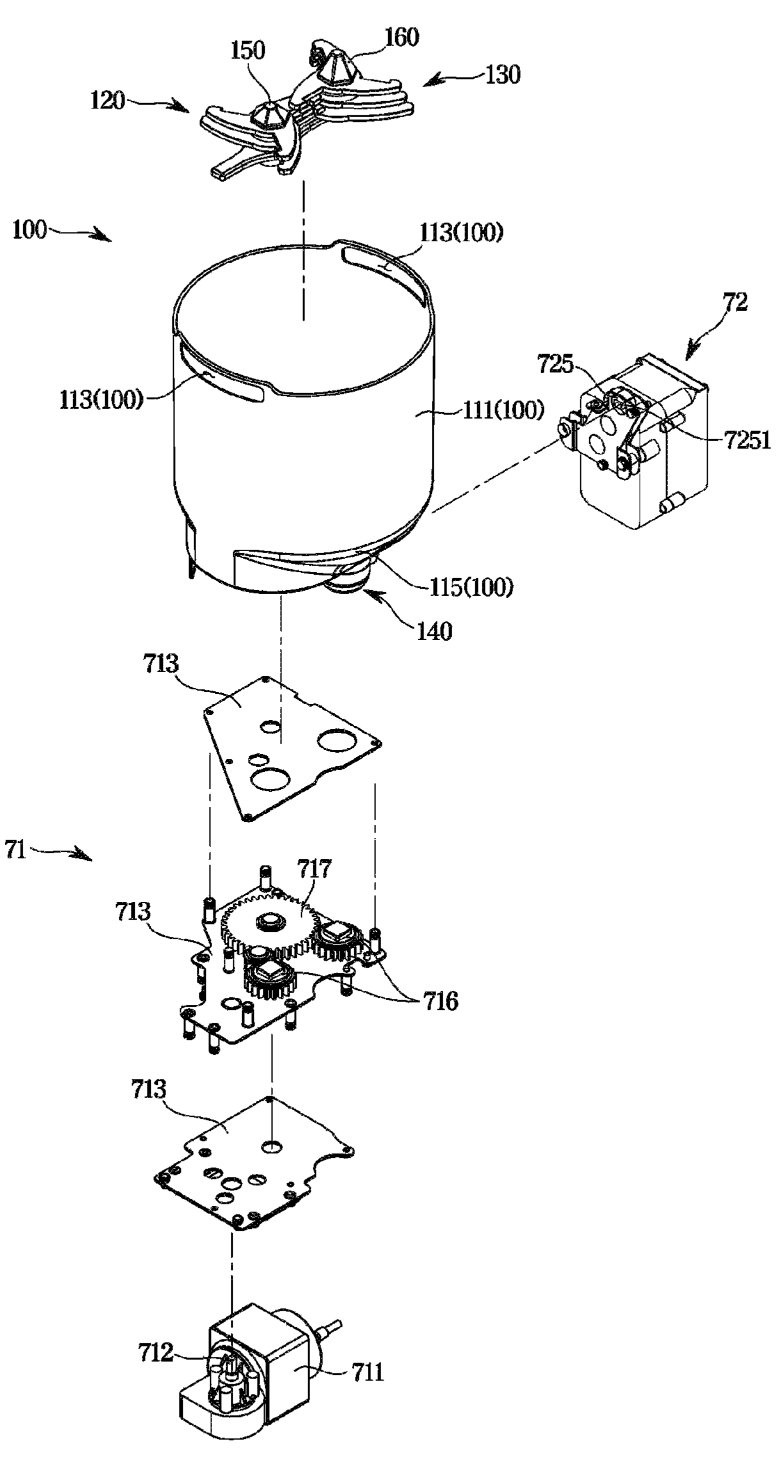
FIG. 8 is an exploded upper perspective view of a grinding device and a driving device of the food waste disposer according to an embodiment, which is seen from an upper side.
Figure 9:
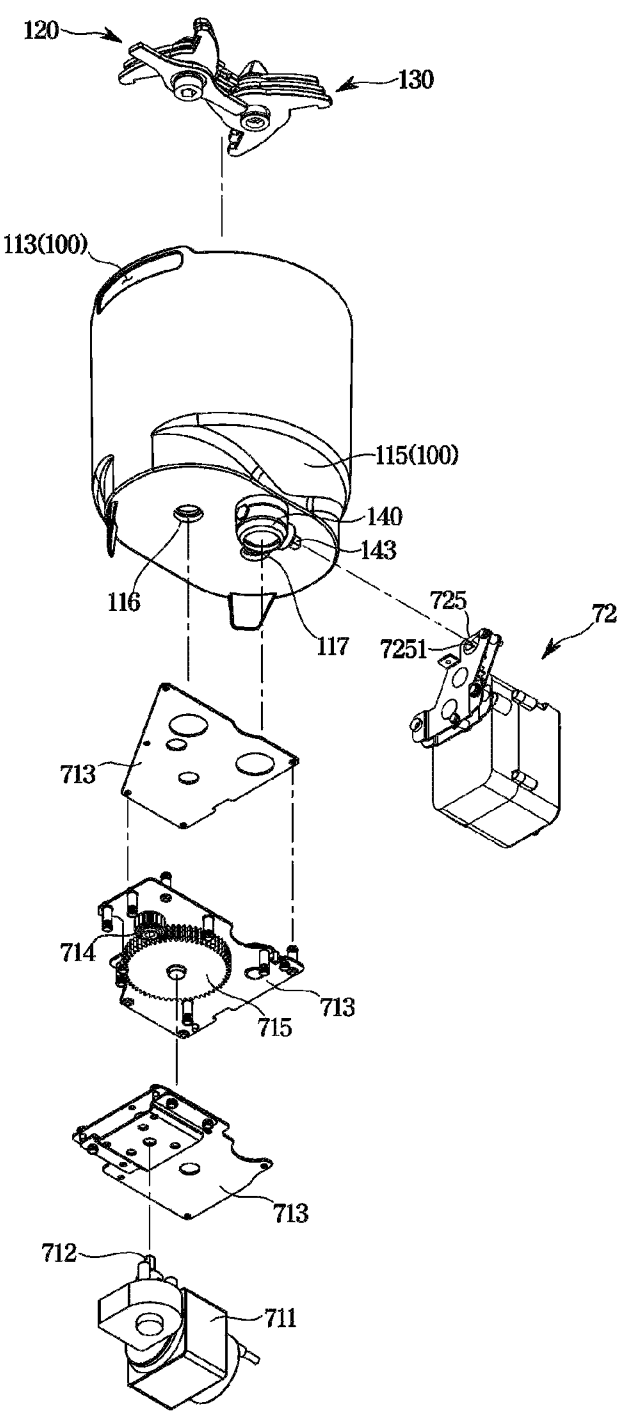
FIG. 9 is an exploded perspective view of the grinding device and the driving device of FIG. 8, which is seen from a lower side.

FIG. 8 is an exploded upper perspective view of a grinding device and a driving device of the food waste disposer according to an embodiment, which is seen from an upper side. FIG. 9 is an exploded perspective view of the grinding device and the driving device of FIG. 8, which is seen from a lower side.

Referring to FIGS. 8 and 9, the grinding device 100 is detachably mounted inside the housing 10 to grind food waste.

The grinding device 100 may include the grinding case 110.

The grinding case 110 may be provided to accommodate food waste therein. The food waste accommodated inside the grinding case 110 may be heated, dried, stirred, and ground.

The grinding case 110 may be provided in a substantially cylindrical shape with an open upper surface. The grinding case 110 may include a pair of the handle parts 113. The pair of handle parts 113 may be provided on opposite sides of an upper end of the grinding case 110. The pair of handle parts 113 may be provided by cutting portions of the grinding case 110 so that the user may grip the handle parts by inserting fingers into the cut portions.

However, the shape of the handle part 113 of the grinding case 110 is not limited thereto. For example, the handle part 113 may be provided to protrude to the outside of the grinding case 110 to form a gripping portion that may be held by the user. The handle part 113 may be provided in various shapes.

Figure 11:
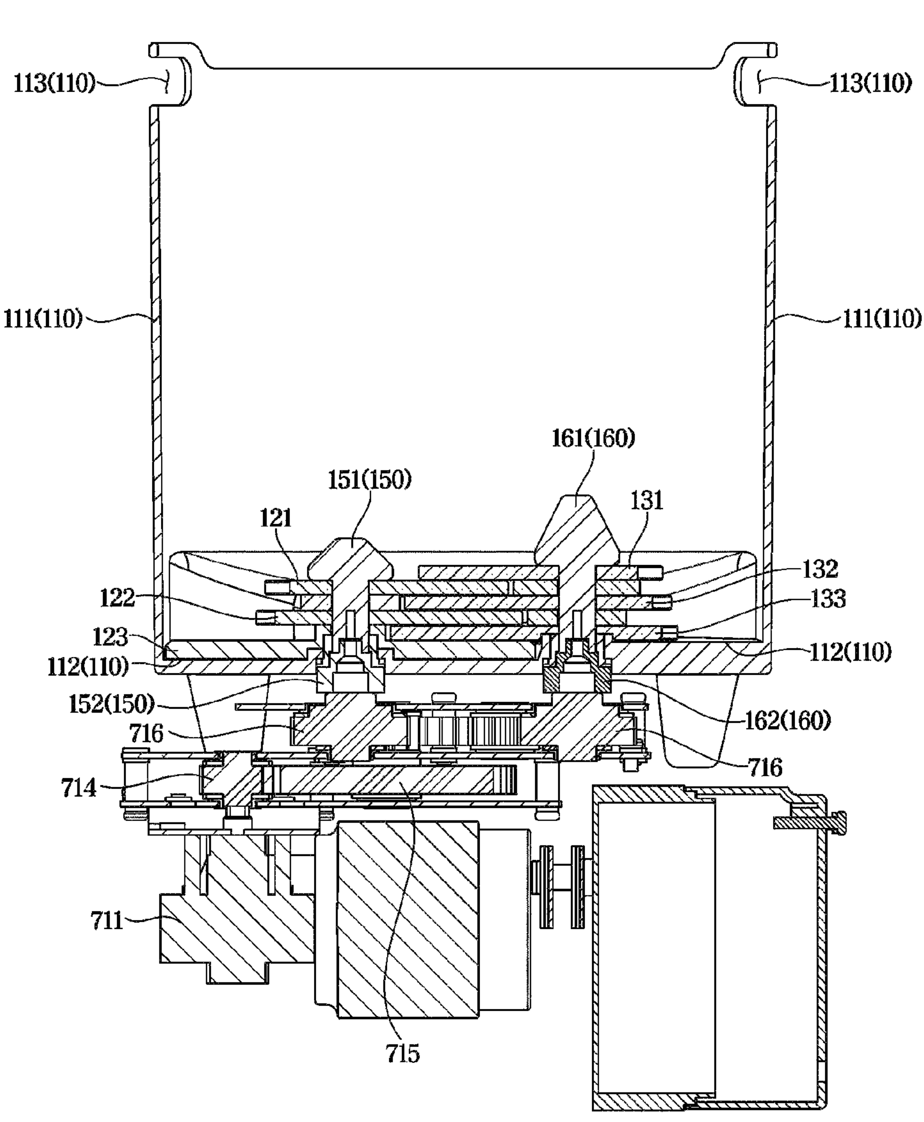
FIG. 11 is a cross-sectional view of the grinding device and the driving device of the food waste disposer according to an embodiment.

The grinding case 110 may include a side wall 111 formed perpendicular to a bottom surface 112 (see FIG. 11). The side wall 111 may form an upper exterior of the grinding case 110.

The grinding case 110 may include an inclined portion 115 formed to be inclined at a lower portion of the side wall 111 so that a cross-sectional area thereof decreases in a direction from the side wall 111 toward the discharge portion 114. Because the first grinder 130 and the second grinder 120 are disposed inside the inclined portion 115, food waste may be ground more efficiently inside the grinding case 110.

The grinding case 110 may include a first shaft hole 117 and a second shaft hole 116.

The first shaft hole 117 may be provided to allow the first grinder shaft 160, which is a rotation axis of the first grinder 130, to pass through the grinding case 110 and be coupled to the first driving device 71 disposed on the lower side of the grinding device 100.

The second shaft hole 116 may be provided to allow the second grinder shaft 150, which is a rotation axis of the second grinder 120, to pass through the grinding case 110 and be coupled to the first driving device 71 disposed on the lower side of the grinding device 100.

The first shaft hole 117 and the second shaft hole 116 may be arranged parallel to each other. More specifically, the first shaft hole 117 and the second shaft hole 116 may be formed to be spaced apart from the valve assembly 140 by the same distance. The first shaft hole 117 and the second shaft hole 116 may be formed in symmetrical positions with respect to the valve assembly 140.

The grinding device 100 may include the valve assembly 140 provided on the lower side of the grinding case 110.

The valve assembly 140 may be provided to open and close the discharge portion 114 formed on the bottom surface 112 of the grinding case 110.

When the valve assembly 140 opens the discharge portion 114, the ground food waste inside the grinding case 110 may be transferred to the storage device 80. Accordingly, the valve assembly 140 and the transfer duct 83 of the storage device 80 may be connected to communicate with each other.

More specifically, a bottom blade provided to rotate at the lowest side of the second grinder 120, which will be described later, may be provided as a transfer blade 123 to transfer the ground food waste collected on the bottom surface 112 of the grinding case 110 to the discharge portion 114 when the valve assembly 140 opens the discharge portion 114.

The valve assembly 140 may be provided as a ball valve to open and close the discharge portion 114 of the grinding case 110 through rotation.

The valve assembly 140 and the grinding case 110 may be formed integrally. However, the valve assembly 140 is not limited thereto and may be provided in a form of being detachably mounted on the grinding case 110. It is sufficient for the valve assembly 140 to be provided to be separable to the outside of the housing 10 along with the grinding case 110.

The grinding device 100 may include the first grinder 130, the second grinder 120, the first grinder shaft 160, and the second grinder shaft 150.

The first grinder 130 and the second grinder 120 may be provided to be rotatable inside the grinding case 110. Specifically, the first grinder 130 and the second grinder 120 may be rotatably mounted on the bottom surface 112 of the grinding case 110. Blades of the first grinder 130 and the second grinder 120 may be arranged in a vertical direction to be alternately stacked with each other. A detailed description thereof will be provided later.

The first grinder shaft 160 may be provided as a rotation axis of the first grinder 130. The second grinder shaft 150 may be provided as a rotation axis of the second grinder 120.

The first grinder shaft 160 and the second grinder shaft 150 may penetrate the bottom surface 112 of the grinding case 110 and pass through the first shaft hole 117 and the second shaft hole 116. The first grinder shaft 160 and the second grinder shaft 150 may be connected to the first drive device 71 to receive power.

The grinding device 100 may include the first driving device 71.

The first driving device 71 may be provided to provide power to the first grinder 130 and the second grinder 120. More specifically, the first driving device may be provided to provide power to the first grinder shaft 160 connected to the first grinder 130 and the second grinder shaft 150 connected to the second grinder 120.

The first driving device 71 may include a first motor 711 provided to generate power. The first driving device 71 may include a first motor shaft 712 protruding upward to transmit power of the first motor 711. The first motor shaft 712 may be provided to be rotatable.

The first driving device 71 may include a first input gear 714 coupled to the first motor shaft 712. The first driving device 71 may include a first transmission gear 715 provided to rotate by being engaged with the first input gear 714. The first transmission gear 715 may have a radius larger than that of the first input gear 714 to be provided as a reduction gear.

The first driving device 71 may include a plurality of first output gears 716. The first output gear 716 coupled to the one first transmission gear 715 of the plurality of first output gears 716 may receive power from the first transmission gear 715 through the same shaft. The first output gear 716 coupled to the first transmission gear 715 may be provided to rotate in the same direction as the first transmission gear 715.

The first output gear 716 coupled to the first transmission gear 715 may be provided to be connected to the second grinder shaft 150.

The first driving device 71 may include a first idle gear 717. The first idle gear 717 may be provided to rotate by being engaged with the first output gear 716 coupled to the first transmission gear 715. The first idle gear 717 may be provided to rotate the other first output gear 716 of the plurality of first output gears 716.

More specifically, one of the plurality of first output gears 716 may receive power from the first transmission gear 715 to rotate the first idle gear 717. In addition, the other one of the plurality of first output gears 716 may be rotated based on the rotation of the first idle gear 717. The other one of the plurality of first output gears 716 may be provided to be connected to the first grinder shaft 160.

Therefore, the plurality of first output gears 716 is provided to transmit the power transmitted by the first input gear 714 to the first grinder 130 and the second grinder 120.

The first input gear 714, the first transmission gear 715, the first idle gear 717, and the plurality of first output gears 716 may be provided to be rotatably supported by a first gear plate 713.

More specifically, the first input gear 714 and the first transmission gear 715 may be disposed between a plurality of the first gear plates 713 at the same height. In addition, the first idle gear 717 and the plurality of first output gears 716 may be disposed between the plurality of first gear plates 713 at the same height.

The grinding device 100 may include the second driving device 72.

The second driving device 72 may be provided to provide power to the valve assembly 140.

The second driving device 72 may be provided to rotate a valve member 142 of the valve assembly 140 of the grinding device 100. The second driving device 72 may be biasedly disposed on one side of the grinding device 100 to provide power to the valve assembly 140.

The second driving device 72 may be provided such that a valve shaft 143 of the valve assembly 140 may be separated upward when the valve assembly 140 closes the discharge portion 114 of the grinding case 110. A detailed description of the second driving device 72 will be described later.

Therefore, the food waste disposer 1 according to an embodiment may include the grinding device 100 detachably mounted inside the housing 10, and the grinding device 100 may include the plurality of grinders provided to grind food waste and the valve assembly 140 provided to open and close the discharge portion 114.

The food waste disposer 1 may include the storage device disposed below the grinding device 100 to store food waste transferred to the discharge portion 114, and a first driving device 71 and a second driving device 72 disposed between the grinding device 100 and the storage device 80 to provide power to the plurality of grinders 120 and 130 and the valve assembly 140, respectively.

The plurality of grinders may include the first grinder 130 and the second grinder 120 provided to be rotated simultaneously through the first driving device 71.

The valve assembly 140 may include the valve shaft 143 connected to the second driving device 72 to rotate the valve member 142 provided to open and close the discharge portion 114, and the valve shaft 143 may be provided to be separable from the second driving device 72 when the valve member 142 closes the discharge portion 114.

Figure 10:
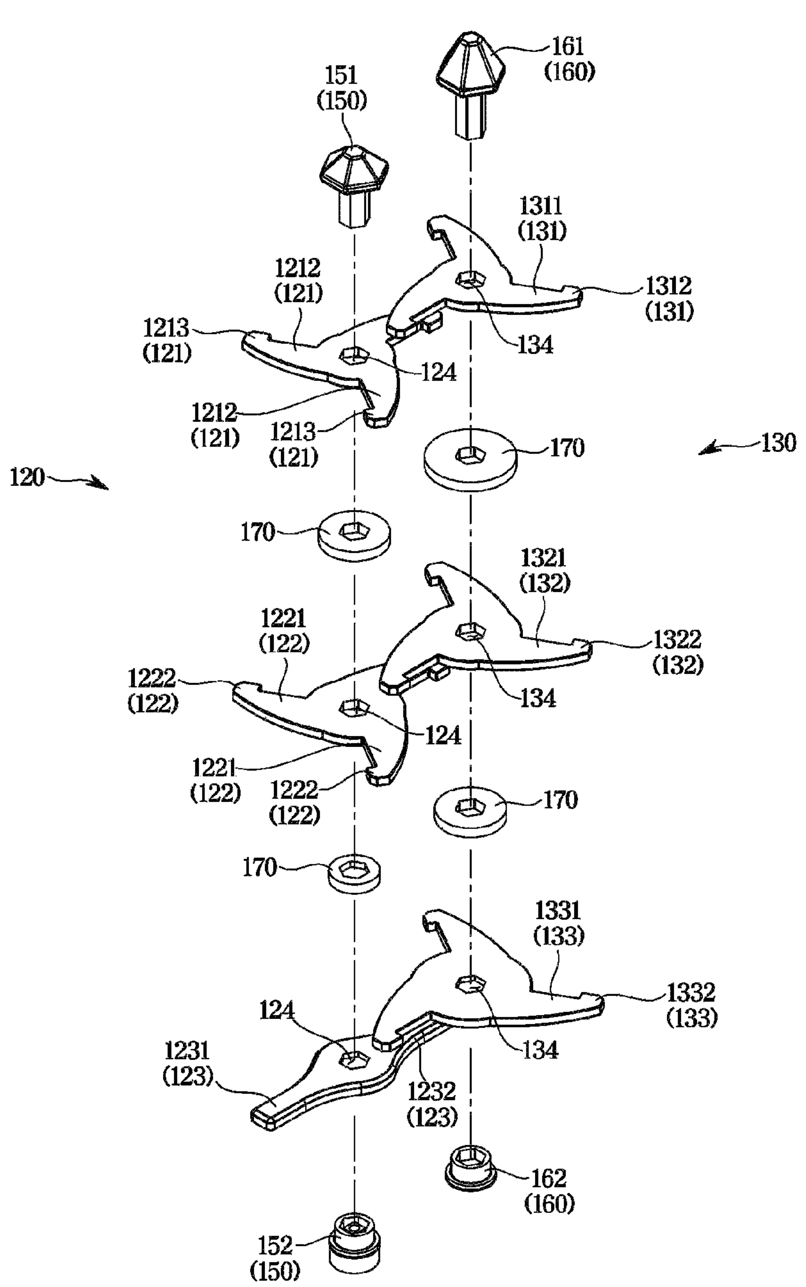
FIG. 10 is an exploded perspective view of a first grinder, a second grinder, a first grinder shaft, and a second grinder shaft in the grinding device of FIG. 8.

FIG. 10 is an exploded perspective view of a first grinder, a second grinder, a first grinder shaft, and a second grinder shaft in the grinding device of FIG. 8.

Referring to FIG. 10, the grinding device may include the first grinder 130, and the second grinder 120 including grinding blades 121 and 122 provided to mutually grind food waste with the first grinder 130 and the transfer blade 123 provided below the grinding blades to transfer the ground food waste to the discharge portion 114.

The grinding device may further include the first grinder shaft 160 and the second grinder shaft 150 provided to transmit rotational forces to the first grinder 130 and the second grinder 120, respectively.

As illustrated in FIG. 6, the heating device 60 of the food waste disposer 1 may include the plurality of shaft passing holes 61 disposed below the grinding device 100 to allow the first grinder shaft 160 and the second grinder shaft 150 to pass therethrough, respectively. Through the plurality of shaft passing holes 61, the first grinder shaft 160 and the second grinder shaft 150 may receive power from the first drive device 71.

The first grinder 130 may include a first upper blade 131, a first middle blade 132, and a first bottom blade 133 that are provided to be rotatable by being axially spaced apart from each other at different heights.

First shaft coupling holes 134 through which the first grinder shaft 160 passes may be formed at centers of the first upper blade 131, the first middle blade 132, and the first bottom blade 133, respectively.

Bearings 170 may be mounted between the first upper blade 131 and the first middle blade 132 and between the first middle blade 132 and the first bottom blade 133, respectively, to assist rotation of the blades.

The first grinder shaft 160 may include a first upper cap 161 and a first lower cap 162. The first upper cap 161 and the first lower cap 162 may be provided to be coupled to each other. The first upper cap 161 may cover a portion of an upper surface of the first upper blade 131 to prevent the ground food waste from being introduced into the first shaft coupling hole 134. The first upper cap 161 may also include a shaft extending downward so that rotation of the first lower cap 162 may be transmitted to the first upper cap 161.

Therefore, a portion of the first upper cap 161 may be accommodated in the first lower cap 162 so that the rotation of the first lower cap 162 may be transmitted to the first upper cap 161.

The first upper blade 131 may include a first upper grinding part 1311 and a first upper protruding part 1312. The first upper grinding part 1311 may extend in a radial direction of the first upper blade 131. FIG. 10 illustrates that three of the first upper grinding parts 1311 are provided to be spaced apart from each other by the same angle, but the number of the first upper grinding parts 1311 is not limited thereto.

The first upper protruding part 1312 may extend horizontally from the first upper grinding part 1311. The first upper protruding part 1312 may be provided to grind food waste more finely through interaction with the second grinder 120.

The first middle blade 132 may include a first middle grinding part 1321 and a first middle protruding part 1322. The first bottom blade 133 may include a first bottom grinding part 1331 and a first bottom protruding part 1332.

Because functions and shapes of the first middle grinding part 1321, the first middle protrusion part 1322, the first bottom grinding part 1331, and the first bottom protrusion part 1332 are the same as those of the first upper blade 131 described above, descriptions thereof will be omitted.

The above-described first upper blade 131, first middle blade 132, and first bottom blade 133 may be referred to as a plurality of first grinding blades. Therefore, the first grinder 130 may include a plurality of the first grinding blades 131, 132, and 133.

The second grinder 120 may include the second grinding blades 121 and 122 and the transfer blade 123 provided to be rotatable by being axially spaced apart from each other at different heights.

A plurality of the second grinding blades 121 and 122 may be provided to include the second upper blade 121 and the second middle blade 122.

The second upper blade 121 may be provided to be rotatable between the first upper blade 131 and the first middle blade 132. The second middle blade 122 may be provided to be rotatable between the first middle blade 132 and the first bottom blade 133.

The transfer blade 123 of the second grinder 120 may be provided to be rotatable below the first bottom blade 133.

Second shaft coupling holes 124 through which the second grinder shaft 150 passes may be formed at centers of the second upper blade 121, the second middle blade 122, and the transfer blade 123 of the second grinder 120, respectively. The bearings 170 may be mounted between the second upper blade 121 and the second middle blade 122 and between the second middle blade 122 and the transfer blade 123, respectively, to assist rotation of the blades.

The second grinder shaft 150 may include a second upper cap 151 and a second lower cap 152. The second upper cap 151 and the second lower cap 152 may be provided to be coupled to each other.

The second upper cap 151 may cover a portion of an upper surface of the second upper blade 121 to prevent the ground food waste from being introduced into the second shaft coupling hole 124. The second upper cap 151 may also include a shaft extending downward so that rotation of the second lower cap 152 may be transmitted to the second upper cap 151.

Therefore, a portion of the second upper cap 151 may be accommodated in the second lower cap 152 so that the rotation of the second lower cap 152 may be transmitted to the second upper cap 151.

The second upper blade 121 may include a second upper grinding part 1212 and a second upper protruding part 1313. The second upper grinding part 1212 may extend in a radial direction of the second upper blade 121. FIG. 10 illustrates that three of the second upper grinding parts 1212 are provided to be spaced apart from each other by the same angle, but the number of the second upper grinding parts 1212 is not limited thereto.

The second upper protruding part 1213 may extend horizontally from the second upper grinding part 1212. The second upper protruding part 1213 may be provided to grind food waste more finely through interaction with the first grinder 130.

The second middle blade 122 may include a second middle grinding part 1221 and a second middle protruding part 1222. Because functions and shapes of the second middle grinding part 1221 and the second middle protrusion part 1222 are the same as those of the second upper blade 121 described above, descriptions thereof will be omitted.

The transfer blade 123 may include a first transfer portion 1231 extending radially outward from a center of the transfer blade and a second transfer portion 1232 extending radially outward from the center so as to be opposite to the extension direction of the first transfer portion 1231.

The transfer blade 123 may be provided in a substantially bar shape extending long.

A length at which the transfer blade 123 extends in a radial direction from a rotation axis is formed to be longer than a length at which the grinding blade extends in a radial direction from a rotation axis. In other words, the transfer blade 123 may be disposed below the plurality of second grinding blades to have a rotation radius larger than a rotation radius of the plurality of second grinding blades.

Therefore, the transfer blade 123 may be provided in a shape optimized for transfer of pulverized food waste.

As the transfer blade 123 is provided to transfer the pulverized food waste to the discharge portion 114, the discharge portion 114 of the grinding case 110 and the valve assembly 140 in communication with the discharge portion 114 may be located within the rotation radius of the transfer blade 123.

Accordingly, the first grinder 130 may include the plurality of first grinding blades disposed to be spaced apart in the vertical direction, and the second grinder 120 may include a plurality of second grinding blades alternately stacked with the plurality of first grinding blades and the transfer blade 123.

FIG. 11 is a cross-sectional view of the grinding device and the driving device of the food waste disposer according to an embodiment.

Referring to FIG. 11, the first grinder 130 and the second grinder 120 may be alternately disposed inside the grinding case 110.

The grinding case 110 may be provided such that a height of the bottom surface 112 on a side on which the first grinder 130 is mounted is different from a height of the bottom surface 112 on a side on which the second grinder 120 is mounted. Specifically, the bottom surface 112 on the side on which the first grinder 130 is mounted may be formed to be higher than the bottom surface 112 on the side on which the second grinder 120 is mounted.

Therefore, ground materials on the first grinder 130 side among the ground materials collected inside the grinding case 110 may be transferred to the second grinder 120 side by the first grinder 130. More specifically, food waste ground by the first bottom blade 133 disposed at the lowermost side of the first grinder 130 may be transferred to the second grinder 120 side.

The food waste transferred to the second grinder 120 may be stirred and ground and then collected on the bottom surface 112 of the second grinder 120 side in the grinding case 110. The collected ground materials may be transferred to the discharge portion 114 by the second grinder 120.

More specifically, food waste ground by the transfer blade 123 of the second grinder 120 may be transferred to the discharge portion 114.

At this time, in a case in which the valve assembly 140 is in a state of opening the discharge portion 114, the ground food waste may be transferred to and stored in the storage device 80 disposed below the grinding device 100.

The first grinder 130 and the second grinder 120 are coupled to the bottom surface 112 of the grinding case 110 so as to rotate about a vertical direction of the grinding case 110.

For convenience, the configuration in which the heating device 60 is disposed between the grinding device 100 and the first driving device 71 has been omitted in FIG. 11.

The first grinder shaft 160 may be inserted into a center of the first grinder 130. The second grinder shaft 150 may be inserted into a center of the second grinder 120.

The first grinder shaft 160 and the second grinder shaft 150 may be coupled to the plurality of output gears to receive rotational forces.

Figure 12:
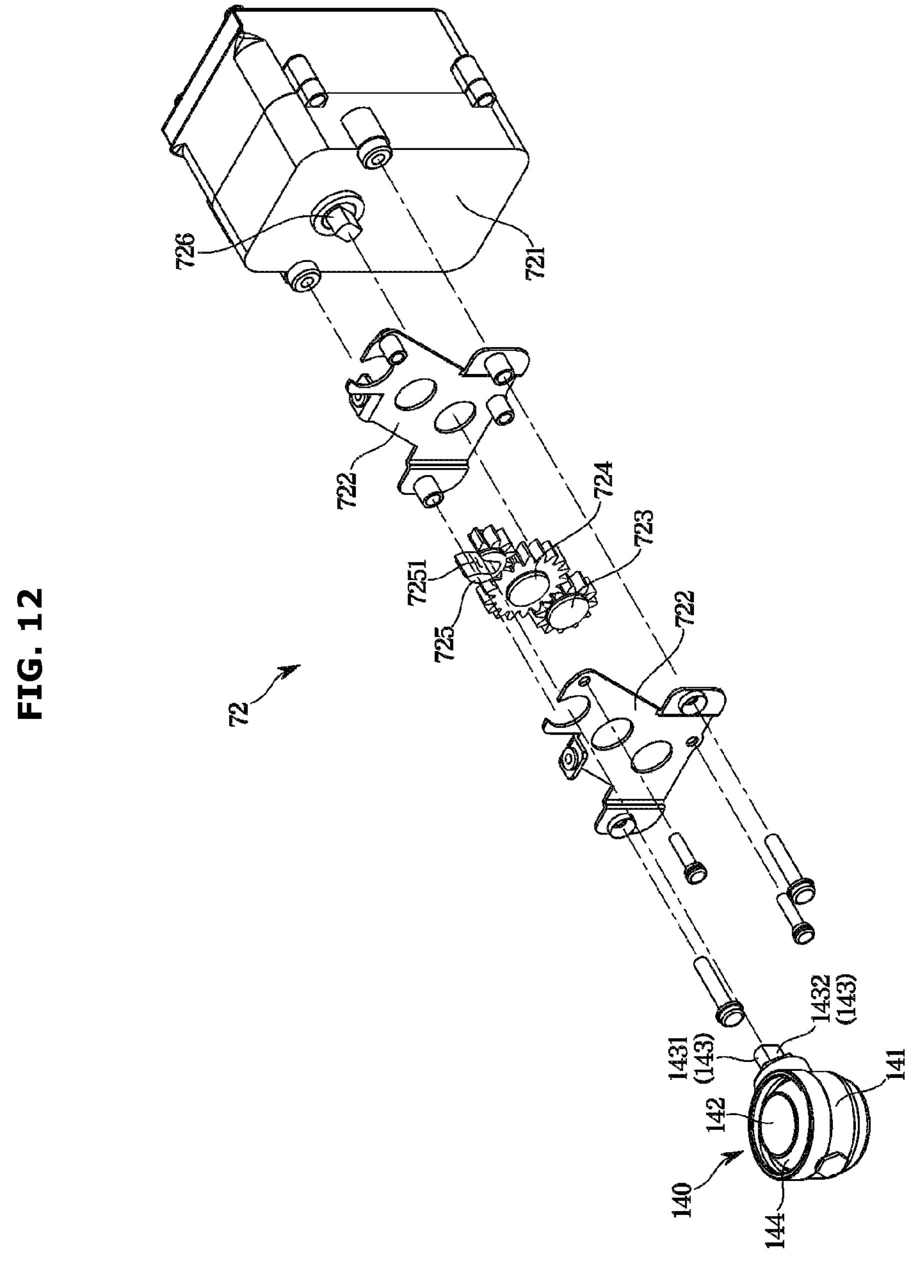
FIG. 12 is an exploded perspective view of a valve assembly and a second driving device of FIG. 8.

FIG. 12 is an exploded perspective view of a valve assembly and a second driving device of FIG. 8.

Referring to FIG. 12, the valve assembly 140 may include a valve member 142 and a valve accommodating case 141.

The valve accommodating case 141 may be provided to accommodate the valve member 142. The valve accommodating case 141 may be provided to protrude toward the lower side of the grinding case 110.

The valve member 142 is provided to be rotatable inside the valve accommodating case 141 to open and close the discharge portion 114. The valve member 142 may be provided as a ball valve.

The valve assembly 140 may include the valve shaft 143 connected to the valve member 142 to rotate the valve member 142. The valve shaft 143 may include a first surface 1431 and a second surface 1432.

More specifically, the first surface 1431 of the valve shaft 143 may be provided to be perpendicular to the second surface 1432. The second surface 1432 may be provided to have a width different from a width of the first surface 1431. Specifically, the second surface 1432 may be provided to have a larger width than the first surface 1431.

The valve shaft 143 may receive power from the second driving device 72 by being connected to the second driving device 72.

The second driving device 72 may include a second motor 721 provided to generate power, a second input gear 723 provided to receive the power from the second motor 721, a second idle gear 724 provided to rotate by being engaged with the second input gear 723, and a second output gear 725 provided to finally receive the power of the second input gear 723 and transmit the power to the valve assembly 140.

The second motor 721 may include a second motor shaft 726 to transmit power to the second input gear 723.

The second input gear 723, the second idle gear 724, and the second output gear 725 may be supported between second gear plates 722.

The second output gear 725 may include a shaft passing groove 7251 having one side opened such that the valve shaft 143 is separated upward from the second output gear 725 when the valve shaft 143 is inserted with the first surface 1431 facing upward.

The valve member 142 rotating in conjunction with the valve shaft 143 may be provided to close the discharge portion 114 when the first surface 1431 of the valve shaft 143 faces upward and the second surface 1432 faces laterally.

Conversely, the valve member 142 rotating in conjunction with the valve shaft 143 may be provided to open the discharge portion 114 when the second surface 1432 of the valve shaft 143 faces upward and the first surface 1431 faces laterally.

Therefore, when the valve member 142 of the valve assembly 140 opens the discharge portion 114, the second surface 1432 of the valve shaft 143 is rotated to face upward, and the shaft passing groove 7251 of the second output gear 725 into which the valve shaft 143 is inserted is opened laterally rather than upward.

Through this, when the user intends to separate the grinding device 100 to the outside of the housing 10 by gripping the handle parts 113 of the grinding case 110 in a state in which the discharge portion is opened, as the valve shaft 143 and the second output gear 725 interfere with each other, the grinding device 100 is not separated to the outside of the housing 10.

That is, the grinding device 100 is provided to be separable to the outside of the housing 10 only in a state in which the valve assembly 140 closes the discharge portion 114.

When the grinding device 100 is separated to the outside of the housing 10 in the state in which the valve assembly 140 opens the discharge portion 114, food waste inside the grinding device 100 may be scattered to the outside of the grinding device 100 through the discharge portion 114.

When the discharge portion 114 of the valve assembly 140 is opened, the first grinder 130 and the second grinder 120 may be rotating to grind food waste, which may cause a safety accident. In addition, failure of the drive device and grinder may occur as the devices are forcibly separated.

Therefore, the food waste disposer 1 according to an embodiment is provided such that the grinding device is separable to the outside of the housing 10 only when the valve assembly 140 closes the discharge portion 114, not only does user convenience increase, but safety accidents may be prevented.

In addition, by grinding food waste through the interaction of the first grinder 130 and the second grinder 120, a large amount of food waste may be processed compared to the same time. Therefore, the processing performance of the food waste disposer 1 may be improved.

In addition, as not only are the first driving device 71 for driving the first grinder 130 and the second grinder 120 and the second driving device 72 for driving the valve assembly 140 provided, but these devices are compactly arranged, the overall size of the food waste disposer 1 may be reduced.

The foregoing has illustrated and described specific embodiments. However, it should be understood by those of skilled in the art that the present disclosure is not limited to the above-described embodiments, and various changes and modifications may be made without departing from the technical idea of the present disclosure described in the following claims.

What is claimed is:

1. A food waste disposer comprising:

a housing;

a grinding device detachably mounted inside the housing to grind food waste; and a storage device disposed below the grinding device to store the ground food waste, wherein the grinding device comprises:

a grinding case in which the food waste is ground, the grinding case having a discharge portion on a lower side of the grinding case, the discharge portion openable to transfer the food waste to the storage device;

a valve assembly configured to open or close the discharge portion and to be separable to outside of the housing together with the grinding case;

a first grinder rotatably mounted inside the grinding case, and having a first grinding blade; and a second grinder comprising:

a second grinding blade to mutually grind the food waste with the first grinding blade of the first grinder; and a transfer blade below the first grinder and the second grinder to transfer the ground food waste by the first grinder and the second grinder to the discharge portion;

wherein a height of a bottom surface of the grinding case on a side on which the first grinder is mounted is different from a height of the bottom surface of the grinding case on a side on which the second grinder is mounted.

2. The food waste disposer according to claim 1, wherein a length at which the transfer blade extends in a radial direction from a rotation axis of the first grinder is formed to be longer than a length at which the first grinding blade extends in the radial direction from the rotation axis of the first grinder.

3. The food waste disposer according to claim 2, wherein the grinding case comprises:

a bottom surface;

a side wall formed perpendicular to the bottom surface of the grinding case; and an inclined portion formed to be inclined at a lower portion of the side wall so that a cross-sectional area of the grinding case decreases in a direction from the side wall toward the discharge portion.

4. The food waste disposer according to claim 1, wherein the transfer blade comprises:

a first transfer portion extending radially outward from a center of the transfer blade in an extension direction; and a second transfer portion extending radially outward from the center of the transfer blade in an opposite direction to the extension direction of the first transfer portion.

5. The food waste disposer according to claim 1, wherein The first grinding blade of the first grinder comprises:

a first upper blade;

a first middle blade; and a first bottom blade that are rotatable by being axially spaced apart from each other at different heights, wherein the second grinding blade of the second grinder comprises:

a second upper blade rotatable between the first upper blade and the first middle blade; and a second middle blade rotatable between the first middle blade and the first bottom blade, and wherein the second grinder comprises the transfer blade, and the transfer blade is rotatable below the first bottom blade.

6. The food waste disposer according to claim 1, further comprising:

a first driving device to supply power to the first grinder and the second grinder to be rotatable; and a second driving device to supply power to the valve assembly to open or close the discharge portion.

7. The food waste disposer according to claim 6, wherein the first driving device comprises:

a first motor to generate power;

a first motor shaft to transmit the generated power of the first motor;

a first input gear coupled to the first motor shaft; and a plurality of first output gears to transmit the power transmitted by the first input gear to the first grinder and the second grinder.

8. The food waste disposer according to claim 6, wherein the second driving device comprises:

a second motor to generate power;

a second input gear to receive the generated power from the second motor; and a second output gear to receive the power from the second input gear and transmit the received power to the valve assembly.

9. The food waste disposer according to claim 8, wherein the valve assembly comprises:

a valve to open or close the discharge portion; and a valve shaft connected to the valve to rotate the valve, the valve shaft comprising a first surface and a second surface perpendicular to the first surface, a width of the first surface being different from a width of the second surface.

10. The food waste disposer according to claim 9, wherein the second output gear comprises a shaft passing groove having one side opened such that the valve shaft is separated upward from the second output gear in response to inserting the valve shaft with the first surface facing upward.

11. The food waste disposer according to claim 1, wherein the grinding device further comprises a first grinder shaft and a second grinder shaft to transmit rotational forces to the first grinder and the second grinder, respectively, and the food waste disposer further comprises a heating device on a lower side of the grinding device, the heating device comprising a plurality of shaft passing holes through which the first grinder shaft and the second grinder shaft pass, respectively.

12. The food waste disposer according to claim 1, wherein the discharge portion and the valve assembly in communication with the discharge portion are located within a rotation radius of the transfer blade.

13. The food waste disposer according to claim 1, wherein the first grinder and the second grinder are coupled to a bottom surface of the grinding case so as to rotate about a vertical direction of the grinding case.

14. The food waste disposer according to claim 1, wherein the grinding device is separable to outside of the housing in a state in which the valve assembly closes the discharge portion.

* * * * *